(12) United States Patent
Chia et al.

(10) Patent No.: US 8,773,807 B1
(45) Date of Patent: Jul. 8, 2014

(54) DISK DRIVE CALIBRATING FLY HEIGHT DURING STARTUP BY READING SPACING PATTERN IN SERVO SECTORS

(75) Inventors: Galvin T. Chia, Rancho Santa Margarita, CA (US); Huanxiang Ruan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/556,573

(22) Filed: Jul. 24, 2012

(51) Int. Cl.
*G11B 21/02* (2006.01)

(52) U.S. Cl.
USPC ............... 360/75; 360/31; 360/69; 360/77.02

(58) Field of Classification Search
USPC ......... 360/75, 55, 77.02, 77.05, 77.08, 77.11, 360/78.04, 78.09
See application file for complete search history.

(56) References Cited

U.S. PATENT DOCUMENTS

| | | | |
|---|---|---|---|
| 5,377,058 | A | 12/1994 | Good et al. |
| 6,147,488 | A | 11/2000 | Bamba et al. |
| 6,266,199 | B1 | 7/2001 | Gillis et al. |
| 6,307,817 | B1 | 10/2001 | Tsuboi |
| 6,393,511 | B1 | 5/2002 | Albrecht et al. |
| 6,501,606 | B2 | 12/2002 | Boutaghou et al. |
| 6,570,378 | B2 | 5/2003 | Goh et al. |
| 6,603,617 | B1 | 8/2003 | Cross |
| 6,630,824 | B2 | 10/2003 | Richter |
| 6,697,203 | B1 | 2/2004 | Cheng et al. |
| 6,714,368 | B1 | 3/2004 | Himle et al. |
| 6,898,033 | B2 | 5/2005 | Weinstein et al. |
| 6,987,630 | B1 | 1/2006 | Higgins et al. |
| 7,016,131 | B2 | 3/2006 | Liu et al. |
| 7,038,875 | B2 | 5/2006 | Lou et al. |
| 7,068,449 | B2 | 6/2006 | Riddering et al. |
| 7,068,451 | B1 | 6/2006 | Wang et al. |
| 7,180,692 | B1 * | 2/2007 | Che et al. .................. 360/31 |
| 7,196,860 | B2 | 3/2007 | Alex |
| 7,209,304 | B2 | 4/2007 | Seng et al. |

(Continued)

FOREIGN PATENT DOCUMENTS

| | | | |
|---|---|---|---|
| JP | 2007-179723 | * | 7/2007 |
| JP | 2007-293948 | * | 11/2007 |

OTHER PUBLICATIONS

Tsai et al, "Configurable NAND Flash Translation Layer", Proceedings of the IEEE International Conference on Sensor Networks, Ubiquitous, and Trustworthy Computing (SUTC'06), Jun. 5-7, 2006, 8 pages.

(Continued)

*Primary Examiner* — Tan X Dinh

(57) ABSTRACT

A disk drive is disclosed comprising a head actuated over a disk comprising a plurality of normal servo tracks each comprising a plurality of normal servo sectors storing head position information, and a fly height calibration servo track comprising fly height calibration servo sectors, each fly height calibration servo sector comprising head position information and a spacing pattern. After positioning the head over the fly height calibration servo track, the head is servoed over the fly height calibration servo track in response to the fly height calibration servo sectors. A dynamic fly height (DFH) setting is calibrated for the DFH actuator in response to the spacing pattern in the fly height calibration servo sectors. After calibrating the DFH setting, the control circuitry seeks the head to a data track defined by at least one of the normal servo tracks, and startup data is read from the data track.

12 Claims, 3 Drawing Sheets

(56) References Cited

U.S. PATENT DOCUMENTS

| | | | |
|---|---|---|---|
| 7,253,984 B1 | 8/2007 | Patapoutian et al. | |
| 7,265,933 B1 | 9/2007 | Phan et al. | |
| 7,324,299 B1 | 1/2008 | Schreck et al. | |
| 7,330,324 B2 | 2/2008 | Morinaga et al. | |
| 7,333,290 B1 | 2/2008 | Kupferman | |
| 7,369,340 B1 | 5/2008 | Dang et al. | |
| 7,408,731 B2 | 8/2008 | Uemura et al. | |
| 7,423,830 B2 | 9/2008 | Ma et al. | |
| 7,426,090 B2 | 9/2008 | Yamashita et al. | |
| 7,468,854 B2 | 12/2008 | Yamashita et al. | |
| 7,477,465 B2 | 1/2009 | Yu | |
| 7,483,234 B2 | 1/2009 | Shimozato | |
| 7,599,139 B1 | 10/2009 | Bombet et al. | |
| 7,715,135 B1 | 5/2010 | Sutardja et al. | |
| 7,719,781 B2 | 5/2010 | Ehrlich et al. | |
| 7,719,785 B2 | 5/2010 | Taniguchi et al. | |
| 7,724,461 B1 | 5/2010 | McFadyen et al. | |
| 7,738,206 B1 | 6/2010 | Lin et al. | |
| 7,817,372 B2 | 10/2010 | Takahashi | |
| 7,830,632 B2 | 11/2010 | Tang et al. | |
| 7,835,104 B2 | 11/2010 | Yamashita et al. | |
| 7,880,992 B2 | 2/2011 | Ozturk et al. | |
| 7,889,448 B2 | 2/2011 | Lu | |
| 7,948,704 B2 | 5/2011 | Ellis | |
| 7,986,487 B1 | 7/2011 | Madden et al. | |
| 7,995,304 B2 | 8/2011 | Ozturk et al. | |
| 8,054,573 B2 | 11/2011 | Mathew et al. | |
| 8,068,299 B2 | 11/2011 | Tsunokawa et al. | |
| 8,098,451 B2 | 1/2012 | Graef | |
| 8,139,307 B2 | 3/2012 | Kim et al. | |
| 8,169,726 B2 | 5/2012 | Wilson | |
| 8,462,454 B1 * | 6/2013 | Katchmart | 360/48 |
| 2002/0062470 A1 | 5/2002 | Yang et al. | |
| 2002/0063559 A1 | 5/2002 | Richter | |
| 2003/0016461 A1 | 1/2003 | Seng et al. | |
| 2003/0043491 A1 * | 3/2003 | Riddering et al. | 360/69 |
| 2003/0067697 A1 | 4/2003 | Weinstein et al. | |
| 2003/0132747 A1 | 7/2003 | Hong et al. | |
| 2007/0174582 A1 | 7/2007 | Feldman | |
| 2007/0268615 A1 * | 11/2007 | McFadyen et al. | 360/75 |
| 2008/0130159 A1 | 6/2008 | Dieron et al. | |
| 2008/0165443 A1 | 7/2008 | Moline | |
| 2008/0165446 A1 | 7/2008 | Partee | |
| 2008/0310043 A1 | 12/2008 | Masuda et al. | |
| 2009/0153996 A1 | 6/2009 | Ellis | |
| 2009/0195902 A1 | 8/2009 | Moser et al. | |
| 2009/0195912 A1 * | 8/2009 | Sato | 360/75 |
| 2009/0213486 A1 | 8/2009 | Takahashi | |
| 2010/0128386 A1 | 5/2010 | Keizer et al. | |
| 2011/0075292 A1 | 3/2011 | New et al. | |

OTHER PUBLICATIONS

Seagate Banded Device Feature Set, Slide Presentation F11131, Seagate, Aug. 16, 2011, 16 pages.

* cited by examiner

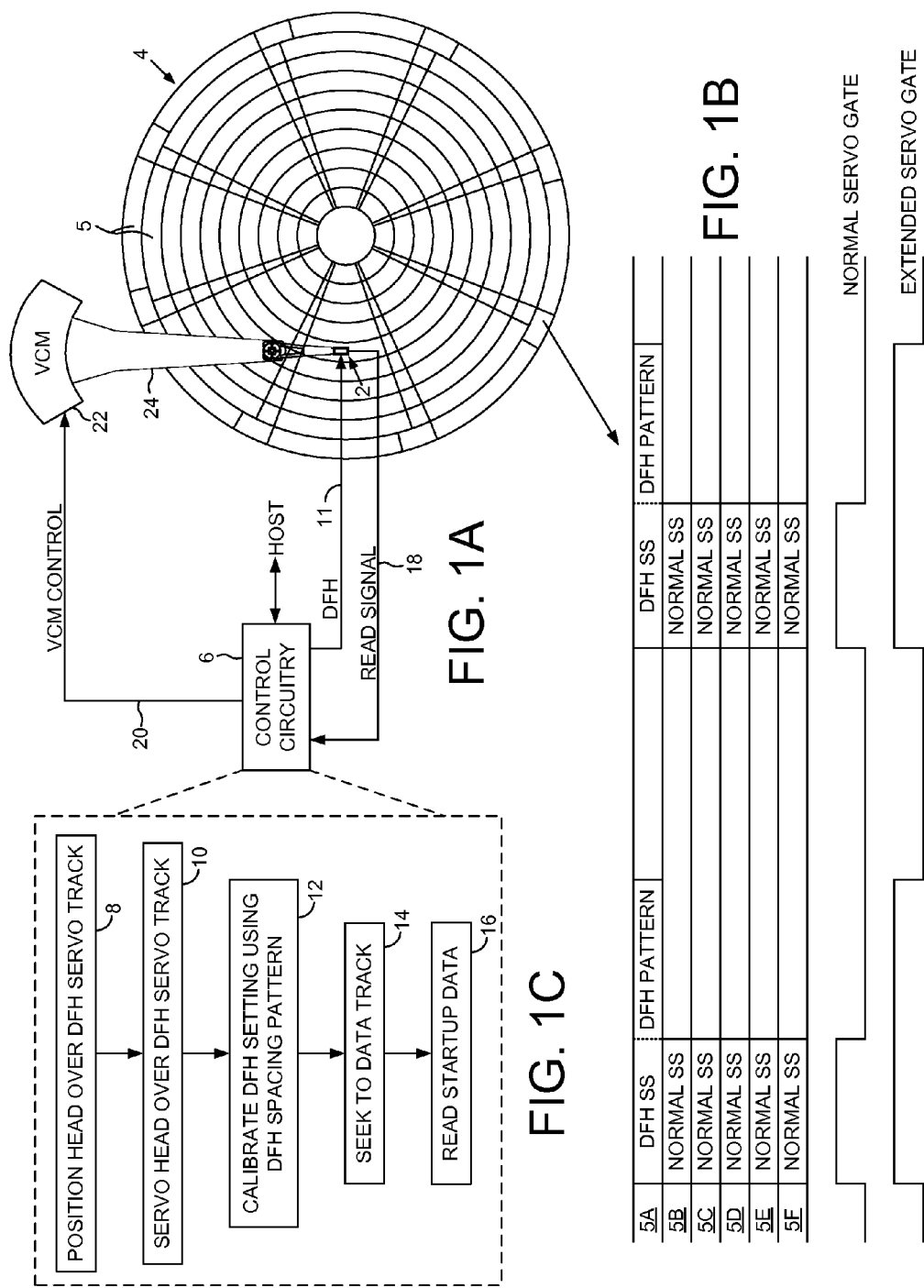

FIG. 2A

| | DFH SS | DFH PATTERN | NO USER DATA |
|---|---|---|---|
| 5A | | DFH PATTERN | NO USER DATA |
| 5B | NORMAL SS | | USER DATA |
| 5C | NORMAL SS | | USER DATA |
| 5D | NORMAL SS | | USER DATA |
| 5E | NORMAL SS | | USER DATA |
| 5F | NORMAL SS | | USER DATA |

FIG. 2B

| | DFH SS | DFH PATTERN | NO USER DATA |
|---|---|---|---|
| 5A | DFH SS | | |
| 5B | NORMAL SS | | USER DATA |
| 5C | NORMAL SS | | USER DATA |
| 5D | NORMAL SS | | USER DATA |
| 5E | NORMAL SS | | USER DATA |
| 5F | NORMAL SS | | USER DATA |

FIG. 3

| | DFH SS | DFH PATTERN | NO USER DATA |
|---|---|---|---|
| 5A | | DFH PATTERN | NO USER DATA |
| 5B | NORMAL SS | | USER DATA |
| 5C | NORMAL SS | | USER DATA |
| 5D | NORMAL SS | | USER DATA |
| 5E | NORMAL SS | | USER DATA |
| 5F | NORMAL SS | | USER DATA |
| 5G | | DFH PATTERN | NO USER DATA |
| 5H | NORMAL SS | | USER DATA |
| 5I | NORMAL SS | | USER DATA |
| 5J | NORMAL SS | | USER DATA |
| 5K | NORMAL SS | | USER DATA |
| 5L | NORMAL SS | | USER DATA |

DISK DRIVE CALIBRATING FLY HEIGHT DURING STARTUP BY READING SPACING PATTERN IN SERVO SECTORS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk, and a dynamic fly height (DFH) actuator for controlling a fly height of the head over the disk.

FIG. 1B shows an embodiment of the present invention wherein the disk comprises a plurality of normal servo tracks and a fly height calibration servo track comprising a spacing pattern.

FIG. 1C is a flow diagram according to an embodiment of the present invention wherein a DFH setting is calibrated during a startup operation by reading the spacing pattern in the fly height calibration servo track.

FIG. 2A shows an embodiment of the present invention wherein user data is not stored in the fly height calibration servo track.

FIG. 2B shows an embodiment of the present invention wherein the spacing pattern may extend up to the entire length between consecutive servo sectors in the fly height calibration servo track.

FIG. 3 shows an embodiment of the present invention wherein multiple fly height calibration servo tracks are spaced radially about the disk.

DETAILED DESCRIPTION

Figure 4:
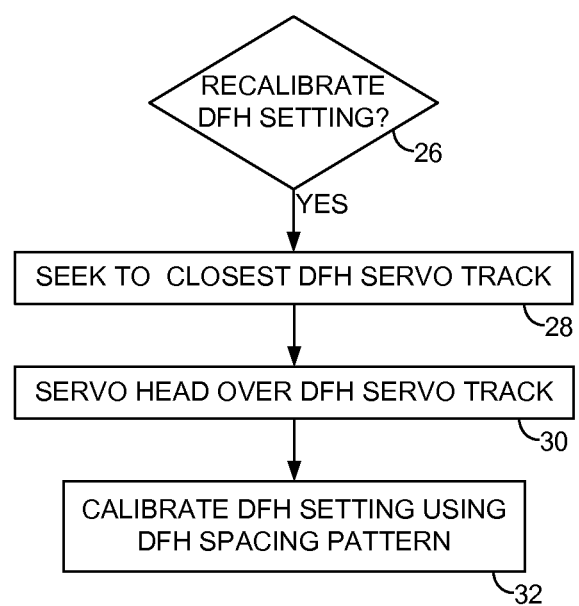
FIG. 4 is a flow diagram according to an embodiment of the present invention wherein when recalibrating the DFH setting, the control circuitry seeks the head to the nearest fly height calibration servo track.

FIG. 1A shows a disk drive according to an embodiment of the present invention comprising a head 2 actuated over a disk 4. In an embodiment shown in FIG. 1B, the disk 4 comprises a plurality of servo tracks 5 including a plurality of normal servo tracks 5B-5F each comprising a plurality of normal servo sectors storing head position information, and a fly height calibration servo track 5A comprising fly height calibration servo sectors, each fly height calibration servo sector comprising head position information and a spacing pattern (DFH pattern). The disk drive further comprises a dynamic fly height (DFH) actuator (such as a heater integrated into the head 2) operable to control a fly height of the head 2 over the disk 4, and control circuitry 6 operable to execute a startup operation outlined in the flow diagram of FIG. 1C. After positioning the head over the fly height calibration servo track (block 8), the head is servoed over the fly height calibration servo track in response to the fly height calibration servo sectors (block 10). A DFH setting 11 is calibrated for the DFH actuator in response to the spacing pattern in the fly height calibration servo sectors (block 12). After calibrating the DFH setting, the control circuitry seeks the head to a data track defined by at least one of the normal servo tracks (block 14), and startup data is read from the data track (block 16).

In the embodiment of FIG. 1A, the control circuitry 6 processes a read signal 18 emanating from the head 2 to demodulate the servo sectors and generate a position error signal (PES) representing an error between the actual position of the head and a target position relative to a target track. The control circuitry 6 filters the PES using a suitable compensation filter to generate a control signal 20 applied to a voice coil motor (VCM) 22 which rotates an actuator arm 24 about a pivot in order to actuate the head 2 radially over the disk 4 in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern.

In one embodiment, data tracks are defined relative to the servo tracks 5, wherein the data tracks may be defined at the same or different radial density than the servo tracks 5. The control circuitry 6 positions the head 2 over a target data track and configures the DFH setting 11 to adjust the fly height of the head 2 in order to access the data track (write/read operations). In one embodiment, the data tracks are used to store startup data for the disk drive, such as parameter settings and/or executable code segments used to operate the disk drive during normal operations. However when the disk drive is initially powered on, the DFH setting 11 that enables accurately reading the startup data from the data tracks may be unknown which can lead to a catastrophic failure. In an embodiment of the present invention, a spacing pattern is recorded in a fly height calibration servo track which enables the DFH setting 11 to be calibrated prior to reading the startup data from the data tracks.

In one embodiment, the data stored in the servo sectors of the servo tracks is recorded at a lower linear bit density than the data stored in the data sectors of the data tracks. This lower recording density enables the control circuitry 6 to accurately read the servo sectors using a more tolerant DFH setting 11 (i.e., using a higher fly height). Since the servo sectors can be read accurately during the startup operation, the spacing pattern in the fly height calibration servo track can be read and used to calibrate an optimal DFH setting 11 for use in reading the startup data from the data tracks. In order to increase the format efficiency of the disk 4, the spacing pattern is not recorded in the normal servo sectors of every servo track, but instead is recorded in the fly height calibration servo sectors of one (or more) fly height calibration servo tracks as illustrated in FIG. 1A. When the disk drive is initially powered on, the control circuitry 6 positions the head over the fly height calibration servo track, calibrates the DFH setting 11 by reading the spacing pattern in the fly height calibration servo sectors, and then seeks to the appropriate data track to read the startup data.

In one embodiment, a servo gate enables the control circuitry 6 to process the read signal 18 while the head is reading a servo sector. In an embodiment illustrated in FIG. 1B, when reading the fly height calibration servo track the servo gate is extended to account for the extra length of the fly height calibration servo sectors due to the spacing pattern (DFH pattern). In the embodiment shown in FIG. 1B the spacing pattern is recorded at the end of each fly height calibration servo sector; however, the spacing pattern may be recorded at any suitable location, such as at the beginning of a fly height calibration servo sector.

FIG. 2A shows an embodiment of the present invention wherein the fly height calibration servo track 5A is not used to store user data (user data is stored between the normal servo sectors of a normal servo track). This embodiment avoids the complexity of the format change due to the extended length of the fly height calibration servo sectors. The overall capacity of the disk 4 in this embodiment is not reduced significantly since there is only a single (or a few) fly height calibration servo tracks. In one embodiment shown in FIG. 2B, if user data is not recorded in the fly height calibration track the spacing pattern may extend up to the entire length between consecutive servo sectors (rather than part of the length as shown in FIG. 2A). This embodiment may reduce the time needed to calibrate the DFH setting 11, for example, by reducing the number of fly height calibration servo sectors that need to be read in order to accurately calibrate the DFH setting 11.

FIG. 3 shows an embodiment of the present invention wherein the disk 4 comprises a second fly height calibration servo track 5G comprising fly height calibration servo sectors, and the second fly height calibration servo track is spaced radially apart from the first fly height calibration servo track. In an embodiment shown in the flow diagram of FIG. 4, the control circuitry 6 may periodically recalibrate the DFH setting 11 during normal operation (e.g., if there is a change in an environmental condition such as a temperature change). When the DFH setting is to be recalibrated (block 26), the control circuitry seeks the head to the closest fly height calibration servo track (block 28), servos the head over the fly height calibration servo track in response to the fly height calibration servo sectors (block 30), and recalibrates the DFH setting in response to the spacing pattern (block 32). Any suitable number of fly height calibration servo tracks may be dispersed radially across the surface of the disk, wherein the average seek latency during a recalibration is reduced as the number of fly height calibration servo tracks increases.

The spacing pattern (DFH pattern) recorded in the servo sectors of the fly height calibration servo track (FIG. 1B) may comprise any suitable pattern. In one embodiment, the spacing pattern comprises a sinusoidal signal generating by recording alternating magnetic transitions at any desired frequency. Any suitable algorithm may be employed to measure the fly height of the head in order to calibrate the DFH setting. For example, a suitable fly height measurement algorithm includes a harmonic ratio technique wherein a ratio of a fundamental and a third harmonic of the sinusoidal signal provides a suitable fly height measurement. In one embodiment, the sinusoidal signal in the spacing pattern may be recorded at a different frequency (e.g., higher frequency) than other fields of the servo sector, such as the preamble or the servo bursts. The different frequency of the spacing pattern may provide a more accurate fly height measurement as compared to using an existing field in a normal servo sector.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
 a disk comprising a plurality of servo tracks including:
  a plurality of normal servo tracks each comprising a plurality of normal servo sectors comprising head position information; and
  a first fly height calibration servo track comprising fly height calibration servo sectors, each fly height calibration servo sector comprising head position information and a spacing pattern,
  wherein the normal servo sectors do not comprise the spacing pattern;
 a head actuated over the disk;
 a dynamic fly height (DFH) actuator operable to control a fly height of the head over the disk; and
 control circuitry operable to execute a startup operation by:
  positioning the head over the first fly height calibration servo track;
  servoing the head over the first fly height calibration servo track in response to the fly height calibration servo sectors;
  calibrating a DFH setting for the DFH actuator in response to the spacing pattern in the fly height calibration servo sectors;
  after calibrating the DFH setting, seek to a data track defined by at least one of the normal servo tracks; and
  reading startup data from the data track.

2. The disk drive as recited in claim 1, wherein the control circuitry is further operable to extend a servo gate when reading one of the fly height calibration servo sectors.

3. The disk drive as recited in claim 1, wherein the first fly height calibration servo track is not used for storing user data.

4. The disk drive as recited in claim 3, wherein the spacing pattern extends substantially the entire length between consecutive fly height calibration servo sectors in the fly height calibration servo track.

5. The disk drive as recited in claim 1, wherein the disk further comprises a second fly height calibration servo track comprising fly height calibration servo sectors, the second fly height calibration servo track is spaced radially apart from the first fly height calibration servo track, and the control circuitry is further operable to periodically recalibrate the DFH setting by:
 seeking the head to the closest of the first and second fly height calibration servo tracks; and recalibrating the DFH setting in response to the spacing pattern in the fly height calibration servo sectors.

6. The disk drive as recited in claim 5, wherein the second fly height calibration servo track is not used for storing user data.

7. A method of operating a disk drive, the disk drive comprising a head actuated over a disk comprising a plurality of servo tracks including a plurality of normal servo tracks each comprising a plurality of normal servo sectors comprising head position information, and a first fly height calibration servo track comprising fly height calibration servo sectors, each fly height calibration servo sector comprising head position information and a spacing pattern, wherein the normal servo sectors do not comprise the spacing pattern, and a dynamic fly height (DFH) actuator operable to control a fly height of the head over the disk, the method comprising:

positioning the head over the first fly height calibration servo track;

servoing the head over the first fly height calibration servo track in response to the fly height calibration servo sectors;

calibrating a DFH setting for the DFH actuator in response to the spacing pattern in the fly height calibration servo sectors;

after calibrating the DFH setting, seek to a data track defined by at least one of the normal servo tracks; and reading startup data from the data track.

8. The method as recited in claim 7, further comprising extending a servo gate when reading one of the fly height calibration servo sectors.

9. The method as recited in claim 7, wherein the first fly height calibration servo track is not used for storing user data.

10. The method as recited in claim 9, wherein the spacing pattern extends substantially the entire length between consecutive fly height calibration servo sectors in the fly height calibration servo track.

11. The method as recited in claim 7, wherein the disk further comprises a second fly height calibration servo track comprising fly height calibration servo sectors, the second fly height calibration servo track is spaced radially apart from the first fly height calibration servo track, the method further comprising periodically recalibrating the DFH setting by:

seeking the head to the closest of the first and second fly height calibration servo tracks; and recalibrating the DFH setting in response to the spacing pattern in the fly height calibration servo sectors.

12. The method as recited in claim 11, wherein the second fly height calibration servo track is not used for storing user data.

* * * * *